(12) United States Patent
Markgraf et al.

(10) Patent No.: US 6,181,691 B1
(45) Date of Patent: Jan. 30, 2001

(54) CONTROL OF A TELEPHONE SWITCHING SYSTEM OVER A DIGITAL INFORMATION NETWORK

(75) Inventors: Frank Markgraf, Sandhausen; Claus Schottmüller, Karlsruhe; Clemens Wittinger, Ludwigshafen, all of (DE)

(73) Assignee: International Business Machines Corporation, Armonk, NY (US)

(*) Notice: Under 35 U.S.C. 154(b), the term of this patent shall be extended for 0 days.

(21) Appl. No.: 08/919,963

(22) Filed: Aug. 28, 1997

(30) Foreign Application Priority Data

Sep. 23, 1996 (EP) .................................. 96115221

(51) Int. Cl.[7] .............................. H04L 12/66; H04J 3/16
(52) U.S. Cl. ......................... 370/352; 370/466; 370/467
(58) Field of Search ................................. 370/466, 467, 370/352, 356; 395/200.5, 200.56, 200.57

(56) References Cited

U.S. PATENT DOCUMENTS

| | | | |
|---|---|---|---|
| 5,732,219 | * 3/1998 | Blumer et al. | 395/200.57 |
| 5,835,724 | * 11/1998 | Smith | 395/200.57 |
| 5,838,682 | * 11/1998 | Deklbaum et al. | 370/401 |
| 5,917,817 | * 6/1999 | Dunn et al. | 370/352 |
| 6,028,917 | * 2/2000 | Creamer et al. | 379/100.01 |
| 6,031,904 | * 2/2000 | An et al. | 379/201 |

\* cited by examiner

*Primary Examiner*—Chi H. Pham
*Assistant Examiner*—Brenda H. Pham
(74) *Attorney, Agent, or Firm*—Daniel E. McConnell

(57) ABSTRACT

A telephone switching center is controlled by a server computer (22) utilizing a Hypertext Transfer Protocol (HTTP), which is connected to a World Wide Web (WWW) network. It is proposed to provide, between a HTTP server (22) and the switching system (23), a control program (20) which enables control of a CTI application by the HTTP server (22). The proposed CTI application (20) provides an interface which uses a Universal Resource Locator (URL) specifying high level communicating functions which are independent of the respective interface (21) to the switching system or the CTI server.

16 Claims, 3 Drawing Sheets

Add Paticipant to Conference Call

Remove Participant To Conference Call

CONTROL OF A TELEPHONE SWITCHING SYSTEM OVER A DIGITAL INFORMATION NETWORK

The present invention pertains to integration of a telephone switching system into a wide area (WAN) or local area (LAN) computer network, where control of a telephone system is to be performed by use of a network communication protocol. In particular, the invention is concerned with control of a telephone switching center by a server computer utilizing a Hypertext Transfer Protocol (HTTP), which is connected to a World Wide Web (WWW) network.

BACKGROUND OF THE INVENTION

Telephone switching systems are commonly used to control communication in a telephone switching network. These systems hereto comprise functional units called "switching centers" which provide functions mainly for setting up and terminating telephone connections between end devices of participiants of the switching network. Further, among others, functions are provided for forwarding telephone calls from a called person to a third person and for setting up telephone conference connections among multiple subscribers.

Thereupon these systems manage participant admission rights and rules control the adjustment of telephone end-devices, and record information about telephone connections having been switched, e.g. for telephone book-keeping or accounting purposes.

In order to provide the above functionality of circuit switched telephone networks in computers, recently Computer-Telephone Integration (CTI) applications have been developed. Hereby the functionality of switching networks is combined with functions of classical information processing. Exemplary CTI systems are a class of applications called "Call Centers" which enable routing of telephone calls to suitable contributors or colleagues of a called participant, and which provide a computer user with utilities allowing activation of telephone functions out of a standard application environment. Another class of applications are dialing support tools in the arena of telebanking.

In a common architecture of existing CTI applications as depicted in FIG. 1, a first computer 1 is connected to a telephone switching system 2 over a physical interface 3, for instance, the interface definition standard "V24" or the standardized Integrated Services Digital Network (ISDN). Through that connection, control commands and messages can be exchanged between the first computer and the switching system according to a defined communication protocol. On the other side, a second computer 4, as a server for the locally or distantly located applications (clients), provides the functionality of the switching system to the applications.

There exist a number of proprietary or standardized CTI interfaces like the "TSAPI" by Novell, "TAPI" by Microsoft/Intel, "CallPath" by IBM. In general, the switching network functions are provided to the application programs through an application program interface (API). Those approaches are broadly discussed in an overview article by T. Nixon, entitled "The Design Considerations for Computer-Telephony Application Programming Interfaces and Related Components" and published in IEEE Communications Magazine vol. 34, no. 4 (1996), pages 43–47.

An approach where a server is attached directly to a telephone switch—in contrast to a concept where a LAN server has to pass telephony signalling to the telephone switch (PBX) over the LAN—is disclosed in an article by S. Rudd, entitled "Where do CTI Applications really belong?", published in Business Communications Review, vol. 26, no. 2 (1996), pages 23–26. the advantage of that concept is that a CTI application not tightly coupled with LAN-attached databases will perform far better and cost much less.

A comparison between known mainframe PBX systems and an approach where a widely distributed group of CTI servers is linked through an isochronous broadband backbone, is given in an article by L. Goldberg, entitled "CTI Computer/Phone Fusion at LAN's Edge" and published in Electronic Design vol. 42, no. 22 (1994), pages 77–90. These servers can be configured to route calls, or they also may take on more specialized functions such as becoming an interface to a public switch telephone network (PSTN) by acting as an automated attendant, voice-mail server, or any other network service.

There exist further generic solutions in the field of voice mail systems which are directly attached to the Internet. A telephone call can be performed via a so-called Webphone service. Another example of a system is "DirectTalkMail" by IBM. Another voice mail system is disclosed in PCT application WO . . . entitled "Voice Mail System" and assigned to the present assignee (Docketno. UK995024). That system provides access to voice mail over the Internet's World Wide Web. A user has to call up a page associated with a specific voice mail system and to enter a mailbox number. A WWW server responds by transmitting a message to the voice mail system itself. A further request may be directed from the server to the voice mail system, which results in the voice mail system returning the actual audio data for the message to be played to the user.

In an article by R. Sergeant disclosed in IBM Technical Disclosure Bulletin vol. 38, no. 8 (1995), pages 415–418, and entitled "Inexpensive Multimedia Facility for Workstation", an arrangement is described which allows a same graphical user interface (GUI) to be utilized when a standard desk telephone is used as audio input/output device. The GUI application sends a comment to a CTI server to ring the telephone at the user's desktop and to set up a connection.

A desktop telephone approach can also be integration of Lotus Notes by Lotus Development Corporation (IBM), where client specific modules handle messages received by a CTI server. These modules communicate via local Inter Process Communication (IPC) means with a Lotus Notes client. The Notes client then starts the appropriate actions for the Notes application, depending on the messages received, e.g. "Open specific Databasees/Database entries" or "Start application specific actions".

Further in IBM Technical Disclosure Bulletin vol. 37, no. 1 (1994) pages 357–358, a "Global Multimedia Hyperspace" concept is disclosed. According to that concept, in case no direct network link exists between two hyperdocument nodes, a telephone link is established between two corresponding computer systems. The hyperlinks need not be simply a local address, instead, it can be a telephone link to a node residing inside another hyperlinked document anyplace in the world. The advantage of this approach is integration of the world in a way analogous to the global Internet, global TV network or the global telephone network.

Known CTI solutions are integrated on a server, like Novell's Telephony Server, and thus have the drawback that due to the various different operating system platforms, in particular in the area of Personal Computers or Workstations, an interface has to be adapted to each client's platform i.e. to be compatible with multiple different operating systems.

SUMMARY OF THE INVENTION

In order to solve that problem, according to the invention, a particular application is provided, between a HTTP (WWW) server and a switching system. The application enables control of a CTI application, i.e. of a switching unit of the switching system, through the HTTP server. In particular, it is proposed to integrate the functionality of a switching network into a WWW server.

In contrast to existing server solutions for control of switching systems like "TSAPI" or "CallPath", the proposed application has the advantage of providing an interface which uses a Universal Resource Locator (URL). The URL, according to the invention, specifies high level communicating functions like 'set up connection', 'terminate connection' 'participant to connection', (telephone conference), or 'removed participant', which are independent of the respective interface to the switching system or the CTI server.

Further command processing at the CTI interface is accomplished in accordance with a request-response protocol known from HTTP. Therefore intermediate states of command processing which occur due to protocol of interaction with the switching system, are handled by the processor and are thus transparent to the user.

In a typical scenario of running a CTI application in accordance with the invention, a user specifies a desired CTI function by using a common WWW browser. The browser forwards the functional request as a HTTP request to a specific WWW server known to the user. The server converts the request into arguments for a (e.g. CGI) executable function calling up the CTI application. The resulting message for executing the CTI application generated by the server is then re-transmitted to the WWW server. The server then informs the WWW browser about the result by using an appropriate HTTP response command.

Because HTTP is a standard protocol for client-server communication, the proposed mechanism provides an open solution concept. WWW access is becoming very widespread, from many different platforms, as is the HTTP communication protocol, for use as WWW protocol on the Internet. HTTPs is further enhanced by its use in the so-called "Intranets" utilized proprietarily by networks of private firms.

The extensive widening of HTTP clients (WWW browsers) in nearly all today existing computer system platforms has the advantageous effect that, for the control of the switching system, no specialized application programs are required on the client's side. Such applications had to be developed separately for each operating system platform.

BRIEF DESCRIPTION OF THE DRAWING

In the following, a preferred embodiment of the invention is described in more detail with reference to the accompanying drawings, where.

DETAILED DESCRIPTION

Figure 1:
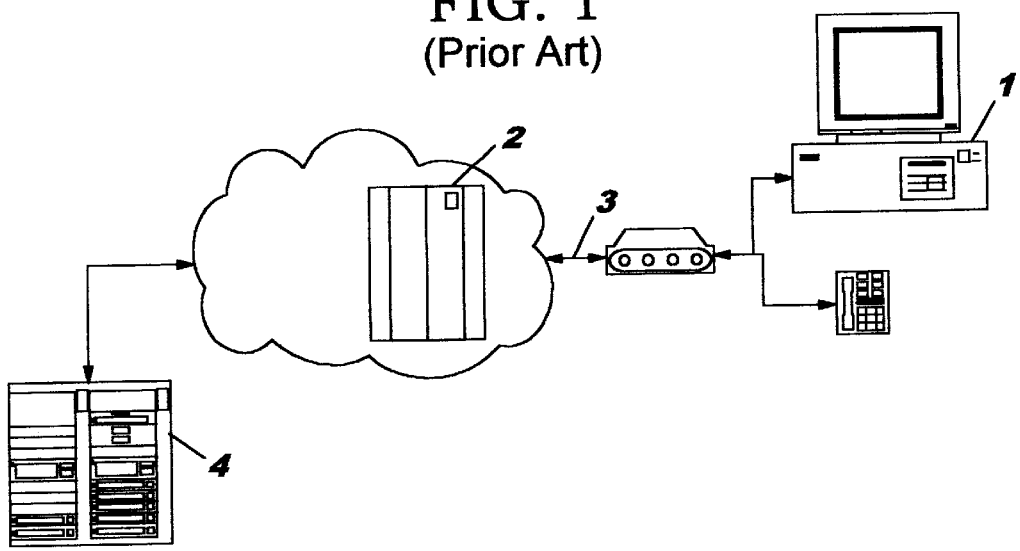
FIG. 1 depicts a prior art architecture of a CTI application where a computer is connected to a telephone switching system over a physical interface.
Figure 2:
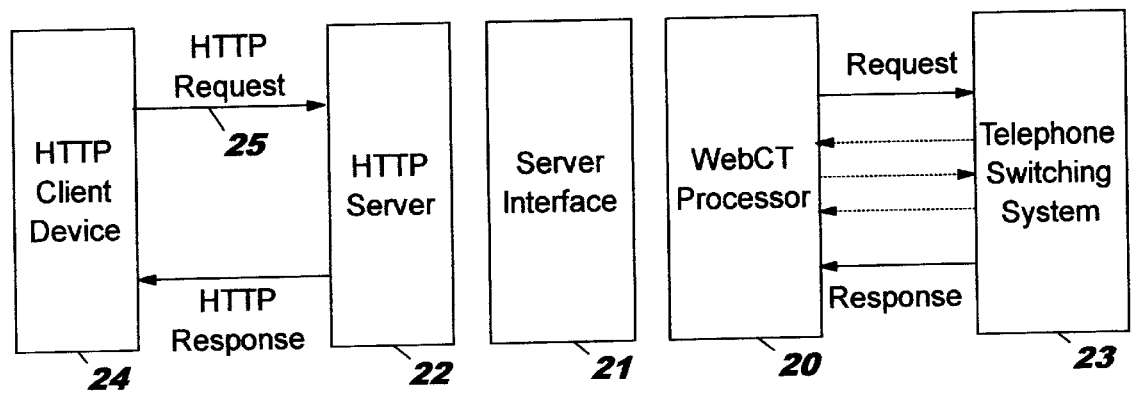
FIG. 2 is a schematic view of the protocol interaction between a common telephone switching system a HTTP client in accordance with the invention.

In the preferred embodiment illustrated now with reference to FIG. 2, the invention is implemented as a control program (application) called "WebCT Processor" 20 which is interposed between an interface layer 21 provided by a HTTP (e.g. WWW) server 22 and a common (telephone) switching system 23. That processor 20 enables control of the switching system through the HTTP server 22. It is hereby emphasized that the invention is not restricted to the field of HTTP servers, but moreover can be used in all kinds of networks which utilize a generic network communication protocol. Further, besides realization as a computer program, the invention can also be implemented as a hardware control unit providing the beforehand cited functionality which is described in more detail in the following.

Figure 7:
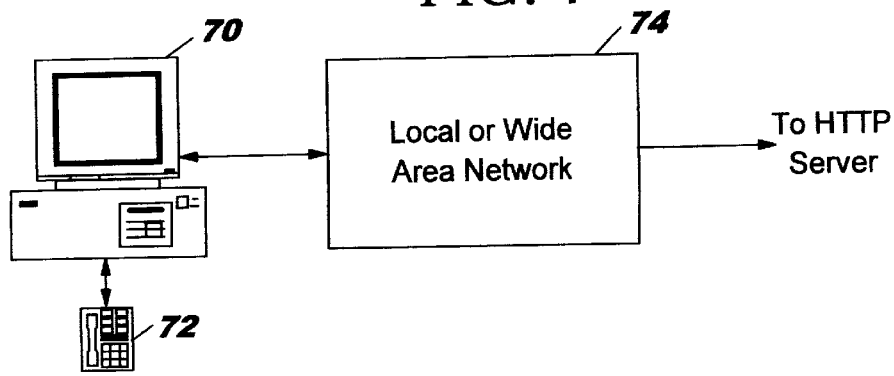
FIG. 7 shows one possible hardware implementation for part of a system in which the present invention may be implemented.
Figure 3:
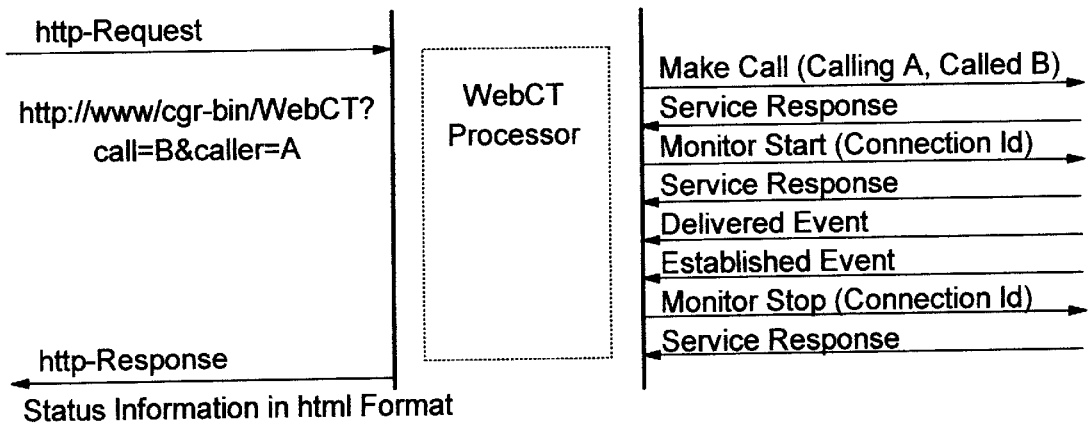
FIGS. 3–6 are protocol diagrams showing four different conversion cases of common telephony commands between a HTTP server and a telephone switching system.
Figure 4:
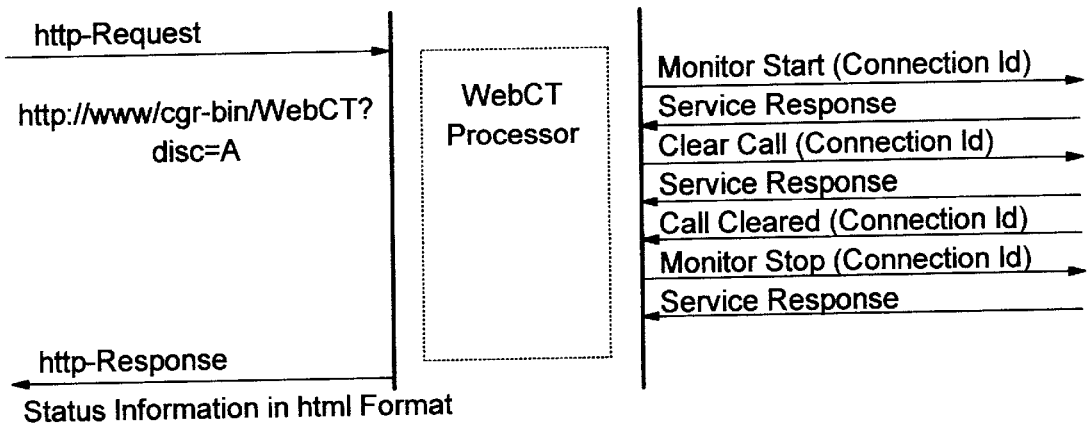
Figure 5:
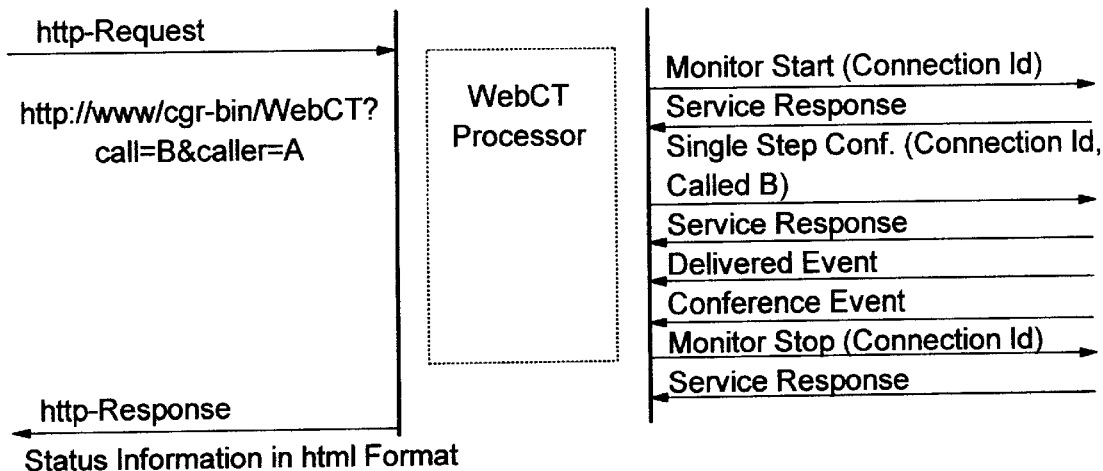
Figure 6:
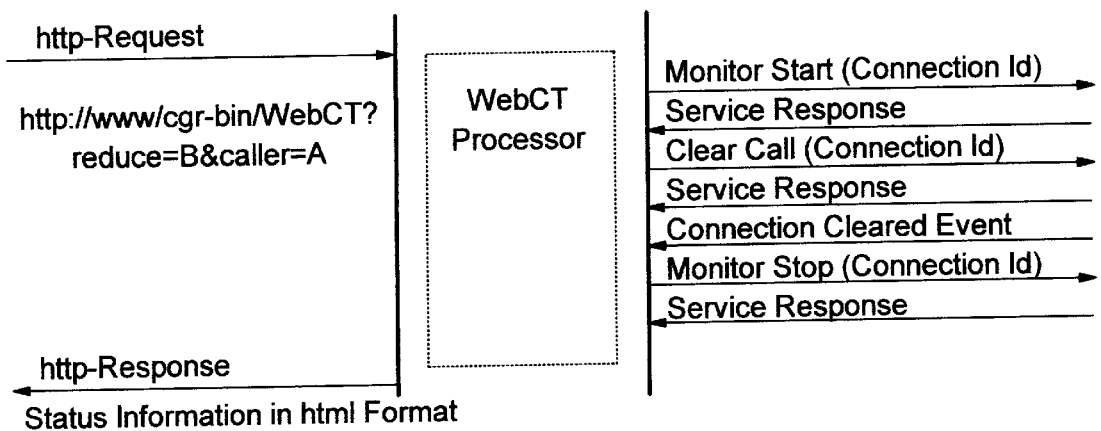

For an interaction between an HTTP client 24 and the switching system 23, the HTTP client 24 sends a request 25 to the HTTP server 22, e.g. the request to set up a connection with a participant identified by a subscriber number. As shown in FIG. 7, the participant would probably be located at a desktop computer system 70 having support for a telephone device 72. The system 70 would be connected to the HTTP server through a local or a wide area network 74 in which predefined client/server communication protocols are implemented. In the preferred embodiment, the request 25 involves (as uniform resource locator (URL) information coded telephony commands which have to be translated by the WebCT processor 20 into respective commands which can be interpreted by the switching system 23. Through the transferred URLs, the HTTP server 22 is instructed to start, over the server interface 21, a specific telephony process related to the request 25. The server interface 21 to the switch can be a Common Gateway Interface (CGI) which is a de factor standard interface, the Netscape Server API (NSAPI) by Netscape, or another equivalent proprietary or standard interface. By that process the commands which are coded with respect to the respective interface 21, are delivered to the switching system 23. It is noted that in the preferred embodiment the above process is identical with the WebCT processor 20 which then takes over control of the communication with the switching system 23.

WebCT/HTTP—Server Interface

The telephony commands are transferred as parameters to the WebCT processor 20 which is called up by the HTTP server 22 via the server interface 21. The WebCT processor 20 controls the whole interaction with the switching system 23. The commands delivered to the WebCT processor 20 are coded as URLs according to the following exemplary URL syntax.

| | |
|---|---|
| REQ | ::= http://host:port/path?<Param> |
| Param | ::= <Param> & <Cmd> \| <Cmd> |
| Cmd | ::= <op> = <val> |
| op | ::=call \| add \| reduce \| disc \| caller \| <SSCtl> |
| val | ::= <SSCtl> \| <digits> |
| digits | ::= <digits><digit> \| <digit> |
| digit | ::= 0 \| 1\| 2\| 3\| 4\| 5\| 6\| 7\| 8\| 9 |
| SSCtl | ::= <Switching system specific control commands> |

Mapping of URLs onto Switching System Interface

The diagrams depicted in FIG. 3–6 illustrate, for the following basic telephony functions, conversion of the commands which are delivered to the WebCt processor through URLs:

a) Set up connection;
b) Terminating connection;

c) Add participant to conference call;

d) Remove participant of conference call;

wherein the switching system is controlled by use of a switching system control report (SSCt1).

The WebCT processor takes over the conversion (translation) of the HTTP commands into the communication protocol of the specific telephone switching system. Intermediate states which occur during the communication phase. In FIG. 3–6, right columns are concerned with processes running on the switching system side), are handled independently by the WebCT processor. After having finished an interaction with the switching system, an appropriate response to the user is generated.

In order to enable communication which is independent of the physical interface to the switching system, the commands to the switching system are described in accordance with the standard "CSTA" (Services for Computer Supported Telecommunications Applications). The commands depicted in each of the right columns of FIG. 3–6, respectively, are taken from the latter standard.

Mapping of the Communication Protocol via CGI

In case of using a Common Gateway Interface (CGI) as HTTP server interface, the submission of parameters is accomplished, depending on the particular HTTP request procedure, either via program parameter (GET) or via a standard entry (POST). The server interface utilizes other parameters for handling further information concerning the HTTP client, which are not essential for the present invention.

Use of the CGI interface has the advantage that the implementation of the invention is simplified by existing publicly available modules. The only disadvantage is that for each request a new process suitable to the WebCT processor has to be initiated. Use of a common application program interface (API) can avoid this drawback, but those interfaces are not standardized and therefore a solution according to the invention would depend on a specific HTTP server.

In the following, an example of code for handling WebCT requests over the CGI interface of the HTTP server is shown. The code is written in "perl" language. It is noted that use of another server interface, for instance "NSAPI" by Netscape, is also possible.

```
#!/usr/bin/perl -w
use CGI;
use strict;
##########

#fail()

sub fail {
    my $qy = @_;
    # Send back html containing failure explanation
}
##########

#ok()

sub ok {
    my $qy = @_;
    # Send back html containing status
}
##########

# call()

sub call {
    my $qy = @_;
    my ($caller, $CMD, $op);
```

```
# Requestor's phone #
# Also serves as an Id for the current call
$caller = $qy->param("caller");
# Get potential commands in fcfs fashion
$CMD = 'CALL' if ($op = $qy->param("call"));
$CMD = 'ADD' if (!$op && ($op = $qy->param("add")));
$CMD = 'REDUCE' if (!$op && (&op = $qy->param("reduce")));
$CMD = 'DISC' if (!$op && ($op = $qy->param("disc")));
# More commands go here
# $op is implied by $CMD
if ($CMD && ($CMD eq 'DISC' || $caller)) {
    system("/usr/cti/webct $CMD $op $caller");
} else {
    fail($qy,(;
    return;
}
ok($qy);
}
##########

# main ()

my $qy = new CGI;
call($qy);
```

In the above exemplary code "#fail()" designates a routine for handling errors (parameters and return codes). Further "ok()" is a routine for signalling that everything in the call went well. By the routine "call()" first parameters and local variables are defined. The requestor's phone number is stored in the variable 'caller' which also serves as an identification (ID) for the current call. It is noted that the syntax "$ . . . " designates definition of a variable.

To get WebCT commands in a "first checked first served fashion" means that commands have a kind of priority like CALL>ADD>REDUCE>DISC. For example, an URL like http:// . . . ?add=1234&call=1234&caller=4321 would actually make a call since 'call' is checked for first although 'add' comes first. This particular order is rather arbitrary and this code can be advantageously used as a kind of sanity check. It should be noted that the command 'DISC' (=DISCONNECT) does not need a caller anyway. Depending on an "if" condition, a call is started or not (i.e. a respective error message is sent back to the requestor), wherein the inner IF block concerns a check whether the process succeeded or not. If not, a CGI parameter error (failure) is sent back to the requestor.

By the "main() routine new CGI objects are created, i.e. "main()" handles all CGI related parameters.

While a preferred embodiment has been described, it is intended that the appended claims shall be construed as including not only the preferred embodiment but also all such variations and modifications as fall within the true spirit and scope of the invention.

What is claimed is:

1. A system for providing an interface between a client device in a computer network and a telephone switching system (TSS) which controls telephone connections over a public switched telephone network (PSTN) using switching commands conforming to PSTN protocols, said telephone switching system having a system management interface, said interface-providing system comprising:

a network server for receiving user commands from the client device through the computer network, said user commands conforming to standard client/server communication network protocols; and a protocol processor connecting said network server and the telephone switching system through the system management interface of said telephone switching system, said protocol processor converting user commands into corresponding switching system commands conforming to TSS protocols.

2. A system according to claim 1 wherein the computer network is a local area network utilizing an HTTP protocol for user commands.

3. A system according to claim 2 wherein the computer network is a wide area network utilizing an HTTP protocol for user commands.

4. A method for controlling a telephone switching system (TSS) from a client device in a computer network wherein the telephone switching system provides switching commands conforming to public switched telephone network (PSTN) protocols for controlling a PSTN, said telephone switching system having a system management interface, said method comprising the steps of:

entering user commands into the computer network from the client device, said user commands conforming the computer network protocols;

receiving the entered user commands at a network server;

converting the entered user commands at the network server to provide switching system commands conforming to TSS protocols; and transmitting the system switching commands to the telephone switching system through the system management interface to enable the telephone switching system to perform operations in accordance with the system switching commands.

5. A control system for a telephone switching system having a system management interface over which telephony commands can be received to control the operation of the telephone switching system, said control system comprising:

a data communications server for receiving requests for telephone switching system operations from a remote client system, said requests conforming to a standard data communications protocol; and a computer-telephony integration (CTI) processor for mapping each of said requests to a command having a format acceptable to the telephone switching system, said CTI processor providing each command to the telephone system over the system management interface.

6. A control system as set forth in claim 5 wherein the requests received at the data communications server include at least requests for call setup, call termination, call forwarding and call conferencing operations to be performed under the control of the telephone switching system.

7. A control system as set forth in claim 6 wherein the remote client is connected to said data communications server through a data communications network.

8. A control system as set forth in claim 7 wherein the data communications network is a wide area network.

9. A control system as set forth in claim 7 wherein the data communications network is a local area network.

10. A control system as set forth in any of claims 5–9 wherein the standard data communications protocol to which requests conform is HyperText Transfer Protocol (HTTP).

11. A method for controlling a telephone switching system having a system management interface on which telephone switching system commands are received, said method comprising the steps of:

receiving requests for telephone switching system operations, said requests conforming to a standard data communications protocol;

mapping each of said requests to a command having a format acceptable to the telephone switching system;

transferring each of said commands to the telephone system through the system management interface; and executing each transferred command in the telephone switching system.

12. A method as set forth in claim 11 wherein the requests for telephone switching system operations include at least requests for call setup, call termination, call forwarding and call conferencing operations to be performed under the control of the telephone switching system.

13. A method as set forth in claim 12 wherein the requests are received over a data communications network.

14. A method as set forth in claim 13 wherein the data communications network is a wide area network.

15. A method as set forth in claim 14 wherein the data communications network is a local area network.

16. A method as set forth in any of claims 11–15 wherein the standard data communications protocol to which requests conform is HyperText Transfer Protocol (HTTP).

* * * * *